No. 883,655. PATENTED MAR. 31, 1908.
E. LOCKYER.
CASTER.
APPLICATION FILED JULY 5, 1907.
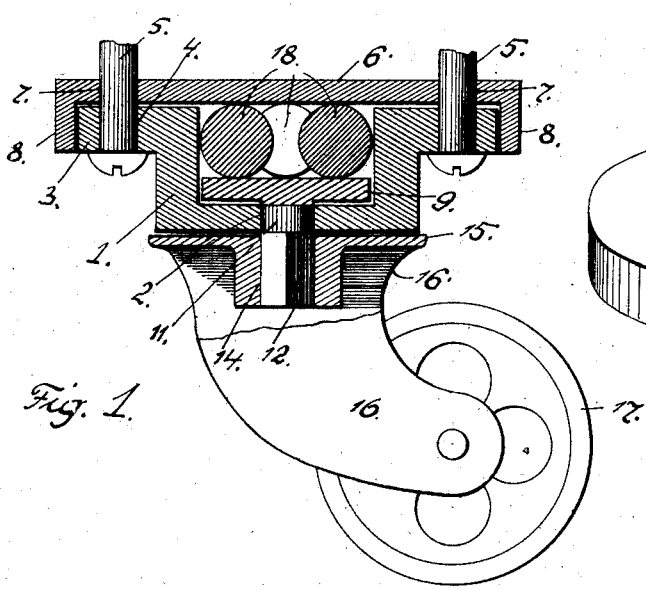
Fig. 1.
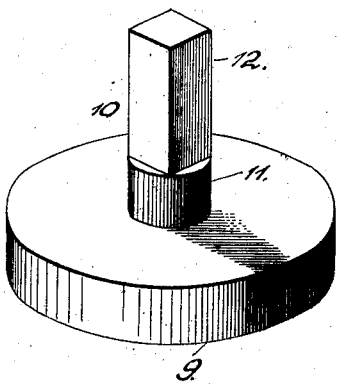
Fig. 2.
Fig. 3.
Fig. 4.
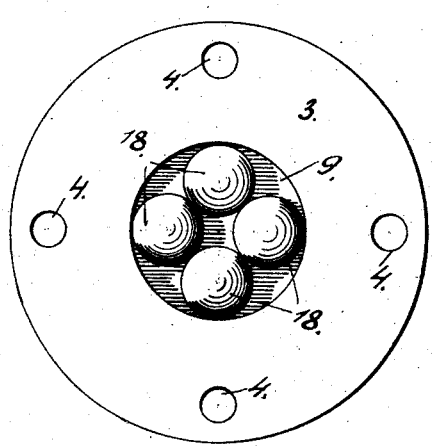
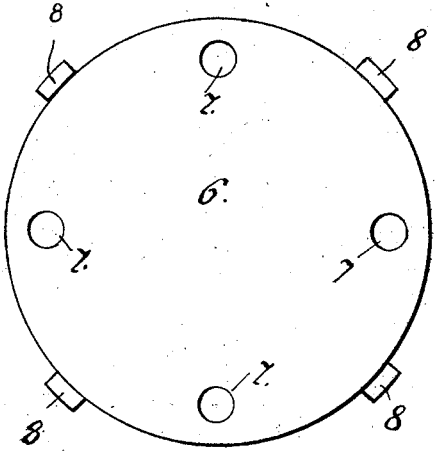
Witnesses
A. H. Rabsag,
R. H. Butler
Inventor
Edward Lockyer
By H. C. Everts
Attorneys

UNITED STATES PATENT OFFICE.

EDWARD LOCKYER, OF McKEESPORT, PENNSYLVANIA.

CASTER.

No. 883,655.

Specification of Letters Patent.

Patented March 31, 1908.

Application filed July 5, 1907. Serial No. 382,305.

*To all whom it may concern:*

Be it known that I, EDWARD LOCKYER, a citizen of the United States of America, residing at McKeesport, in the county of Allegheny and State of Pennsylvania, have invented certain new and useful Improvements in Casters, of which the following is a specification, reference being had therein to the accompanying drawing.

This invention relates to improvements in casters, and the invention has for its primary object to provide a novel ball bearing caster, wherein the ball races or grooves commonly used are dispensed with.

Another object of this invention is to provide a ball bearing caster wherein a novel housing is used for retaining the balls, whereby they cannot become easily displaced.

A further object of this invention is to provide a ball bearing caster having a short and substantial wheel frame connection, thereby avoiding the possibility of the wheel frame being bent out of alinement with the body of the caster.

A still further object of this invention is to provide a ball bearing caster in which the friction between the movable parts of the caster is reduced to a minimum.

With the above and other objects in view, which will more readily appear as the invention is better understood, the same consists in the novel construction, combination and arrangement of parts, to be presently described, and then specifically pointed out in the appended claims.

Referring to the drawing forming part of this specification, Figure 1 is an elevation of the caster, partly in section. Fig. 2 is a perspective view of an inverted revoluble disk. Fig. 3 is a plan of the body or socket of the caster, and Fig. 4 is a bottom plan of a cover plate or closure forming part of the caster.

To put my invention into practice, I construct my improved caster of a cylindrical body or socket 1 having a central vertically disposed cylindrical opening 2. The body or socket of the caster is provided with a peripheral flange 3, having a plurality of equally spaced openings 4 formed therein to receive screw bolts 5, employed for fastening the caster to a piece of furniture or the like article. The screw bolts 5 also serve functionally for retaining a cover plate or closure 6 upon the peripheral flange 3, said cover plate or disk having openings 7 adapted to aline with the openings 4 further having a flat lower face constituting a bearing surface.

To permit of the cover plate or closure 6 being equally placed in engagement with the peripheral flange 3 and retained in position, I provide the cover plate or closure with depending lugs 8 for embracing the outer edges of the peripheral flange 3.

In the body or socket 1 of the caster is mounted a revoluble disk 9 having a flat upper face constituting a bearing surface and further provided with a central depending shank 10, that portion of the shank passing through the opening 2 being cylindrical, as at 11, while the remainder of the shank is rectangular in cross section, as at 12, to snugly fit in an opening 14 formed centrally of a wheel-frame or yoke 15, between the side arms 16 of which is journaled a wheel or roller 17.

Between the revoluble disk 9 and the cover plate or closure 6 is mounted a plurality of balls 18, said balls bearing against the flat lower face of the closure 6 and flat upper face of the disk 9, the balls 18 also bear against the wall of the socket 1. By setting up the bearing surfaces for the balls 18 in the manner as stated the area of the points of contact between the bearing surfaces and the balls is reduced consequently reducing friction to a minimum. This is evident, owing to the flat lower face of the plate 6 and the flat upper face of the disk 9, such faces constituting flat bearing surfaces.

From the novel construction of the caster as disclosed in the accompanying drawing, it will be observed that the purchase of the disk shank in the wheel-frame and the body of the caster is comparatively short, thus eliminating all tendency on the part of the disk shank to bend, when subjected to stresses and strains exerted upon the caster by the load carried thereby. When the caster is properly assembled it will be impossible for the ball bearings thereof to become disarranged or displaced from the caster, and in this connection I desire to call attention to the fact that the cover plate or closure can be independently secured to the body or socket of the caster, and then the caster suitably secured to a piece of furniture or the like article, either by the cover plate or closure or some suitable means.

It is obvious that such changes in the size, proportion and minor details of construction, as are permissible by the appended claims, can be resorted to without departing from the spirit and scope of the invention.

Having fully described my invention, what I claim and desire to secure by Letters Patent is:

1. A caster embodying a cylindrical body or socket having a central cylindrical opening formed therein, a peripheral flange carried by said body, a cover plate fitting upon said flange and inclosing said body, a revoluble disk mounted in said body and having a depending shank protruding through said opening, a wheel-frame fixed upon the ends of said shank, a wheel journaled in said frame, ball bearings arranged between said disk and said cover plate, and means for securing said cover plate to the flange of said caster.

2. A caster embodying a body or socket, a cover plate secured upon said body, a revoluble disk mounted in said body and having a shank protruding through the bottom of said body, a wheel-frame fixed upon the end of said shank, a wheel journaled in said frame, and ball bearings arranged between said disks and said plate.

3. A caster embodying a body or socket, a revoluble disk mounted in said body or socket and having a depending stem protruding therefrom, a wheel-frame fixed upon said shank, a wheel journaled in said frame, ball bearings resting upon said disk, and means for retaining said ball bearings in said caster body.

In testimony whereof I affix my signature in the presence of two witnesses.

EDWARD LOCKYER.

Witnesses:
   H. A. DUNSHEE,
   F. H. MANSFIELD.